United States Patent

[11] 3,601,003

| | | | |
|---|---|---|---|
| [72] | Inventor | Roland Guyot<br>Cortaillod, Switzerland | |
| [21] | Appl. No. | 802,140 | |
| [22] | Filed | Feb. 25, 1969 | |
| [45] | Patented | Aug. 24, 1971 | |
| [73] | Assignee | Lamex S.A.<br>La Choux de Fonds, Switzerland | |
| [32] | Priority | May 29, 1968 | |
| [33] | | Switzerland | |
| [31] | | 7947/68 | |

[54] DEVICE FOR IMMOVABLY HOLDING A ROD DURING A MACHINING OPERATION
3 Claims, 1 Drawing Fig.

[52] U.S. Cl................................................. 90/11 R,
90/21, 90/DIG. 16, 83/465, 269/266, 269/292, 269/317
[51] Int. Cl...................................................... B23c 3/00,
B23c 9/00

[50] Field of Search............................................90/11, 11.3,
21, 59.6, 15.1, 56; 83/465; 10/10; 269/266, 292, 317

[56] References Cited
UNITED STATES PATENTS
2,820,972   1/1958   Ptak ..............................   10/10

*Primary Examiner*—Gil Weidenfeld
*Attorneys*—Robert E. Burns and Emmanuel J. Lobato ABSTRACT: A device for immovably holding a rod during a machining operation comprises means for forming surface contours on the rod before the rod is advanced through a machining zone and a movable profiled surface coacting with the surface contours on the rod to releasably hold the rod in place during the machining operation. A plurality of reciprocating holding members cooperate together to immovably hold the contoured rod against the profiled surface during the machining operation.

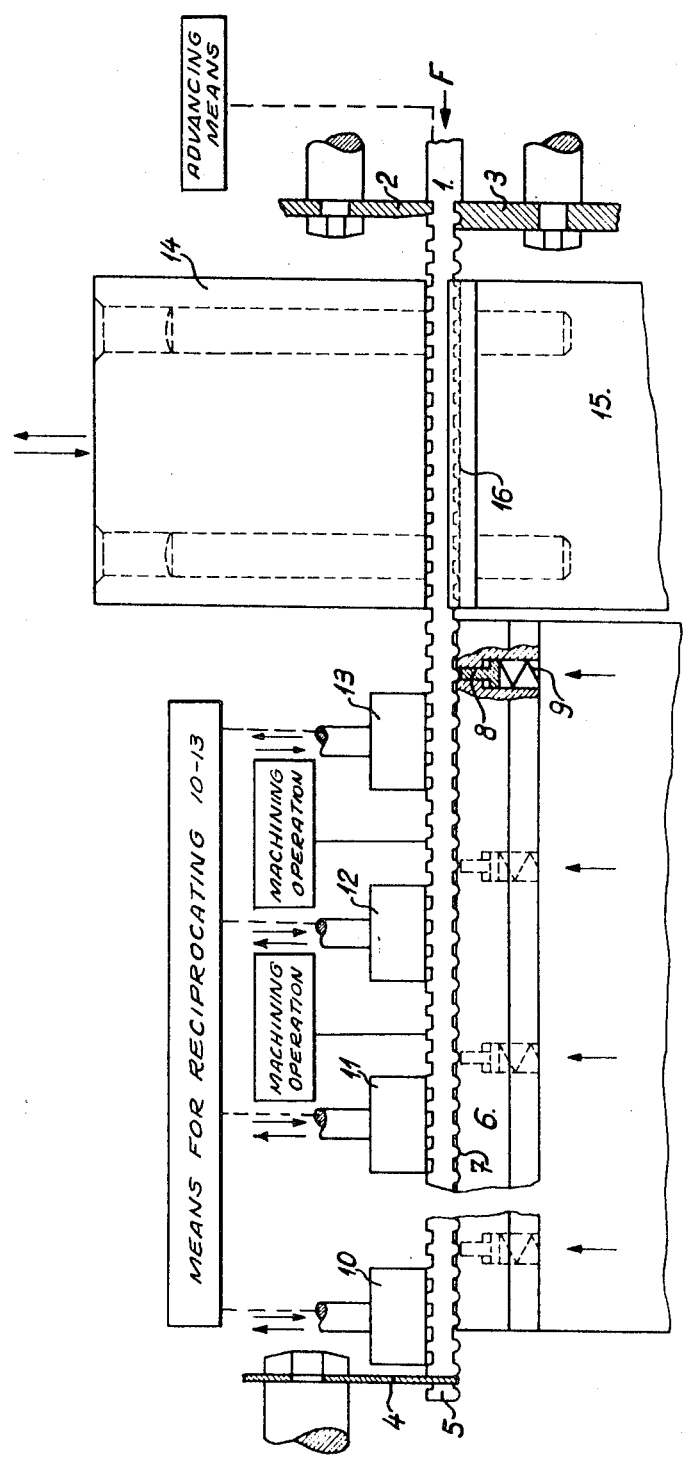

DEVICE FOR IMMOVABLY HOLDING A ROD DURING A MACHINING OPERATION

The present invention relates to an apparatus for positioning a bar in a transfer machine which comprises several work stations in front of which passes the bar to be machined and finally cut.

An exact positioning of the feed bar is particularly necessary, for example, during the fabrication of wristlet elements intended to be articulated to one another. The thickness of each element and ultimately, the thickness of the bracelet, is determined by the position of the bar in front of the cutting station. The interpenetrating parts of two neighboring links must be also milled with great precision in such a way that the play of the articulation be the same for each of the articulations so as to obtain a constant curvature of the bracelet, this curvature being limited by the stop means machined in the links. The same is true of the piercing of the passage for the articulation pin.

In known machines, the bar is positioned at the entrance of the machine only, for example, by means of a comb which engages in the first profile machined in the bar, this profile generally constituting the first phase of machining of the elements that are desired. If such a positioning suffices for the making of certain parts, it has proven that it is completely insufficient for the making of links for a bracelet of the type above described.

Bracelets obtained in this manner in effect have an irregular thickness and certain elements must be eliminated for they cannot be assembled to another element. Also, the curvature of the bracelet is irregular and the stop means sometimes become inefficient owing to the differences in the size. These disadvantages are due to the variation of the length of the bar in the transfer machine, such variation resulting on the one hand from mechanical stresses and on the other hand from temperature variations. On a brass bar 1 meter in length, a temperature difference of a few degrees causes a difference in length of several hundredths of a millimeter which cannot be commercially tolerated.

The invention comprises a device for releasable holding a bar or rod during a machining operation characterized by the fact that it comprises a support extending along at least approximately the entire length of the machine and having a toothed surface of a shape corresponding to that machined in the bar at the entrance of the machine. Advancing means are provided for advancing the bar away from the support and the device includes means for maintaining the bar against the support and means for locking the bar in place during its machining.

The accompanying drawing represents by way of example one embodiment of the device according to the invention.

The single FIGURE of the drawing shows schematically a transfer machine for making bracelet links described in Swiss Pat. application No. 12 292/67 from a bar or rod 1 passing along a predetermined path in front of several machining stations distributed along the bar within a machining zone. A first station is positioned at the entrance to the machine and comprises two profiling cutters 2 and 3 for milling a surface contour or profile on the two opposite sides of the bar. The intermediate stations are shown in block form and represent conventional machining operations.

These are stations for piercing the articulations, for milling the inclined sides, shoulders, and spacers which give the desired shape to the elements which are finally cut by a cutter 4. The purpose of the various machining operations is to obtain, after cutting, bracelet elements 5 which have exact sides and perfectly equal thicknesses.

The positioning or holding device comprises a support 6 in the shape of a rectilinear rail having a toothed profile surface 7 corresponding to the surface contour or profile obtained in the bar by the screw cutter 3. As shown in the drawing, the profiled surface 7 of the support 6 complements the surface contour of the rod 1 whereby the two surfaces may be releasably held in mating, complementary relationship to hold the rod 1 stationary during the machining operations. The support 6 is formed of high quality steel which is not tempered in order to avoid a variation in the size of the profile 7 which is machined with great precision. The resistance to wear of profile 7 is ensured by a coating of hard chromium. In support 6 are positioned extractors 8 mounted on compression springs 9. Grip bars or biasing means 10, 11, 12 and 13 which may be operated mechanically, hydraulically or pneumatically, bias the bar 1 against support 6 during the various machining operations. The advance of the bar is ensured by an advancing mechanism which pushes the bar in the direction F. The movements of the different tools of the work stations, of the grip bars and of the advance device are synchronized in such a way that during the advance of the bar, the grip bars move away from the bar which is raised by the extractors 8 under the urging of springs 9. The guiding and the locking of the bar are ensured by a block 14 whose fixed lower part 15 has a channel 16 for laterally guiding the bar.

The device functions according to the following cycle: advance of the rod 1 in the direction F, positioning by the descent or reciprocation of grip bars 10 to 13 locking by block 14, milling of profile by cutters 2 and 3 and other machining operations including cutting by screw cutter 4, ascent or return reciprocation of the grip bars, then extraction by extractors 8.

Bar 1 is applied with sufficient force against support 6 so that all variations in length are prevented and even corrected.

In order to obtain, from the beginning of the bar, a sufficient precision, there is first machined at the extremity of the bar a series of profiles or surface contours by means of cutter 3 or a similar cutter or forming means, then the part is disposed in position in a matrix machined in a similar way to support 6 to terminate the profile in such a way that it will adapt exactly on the positioning support 6.

The device has been described in connection with the making of bracelet links but it is evident that it can be used for the series fabrication of any part either intended or not intended to be assembled to one another and which must have dimensions of a rigorous precision.

The profile used for the positioning can be an auxiliary profile serving only for positioning and which is eliminated later.

WHAT IS CLAIMED IS:

1. A device for releasably holding a rod during a machining operation comprising: advancing means for advancing a rod along a predetermined path through a machining zone; forming means disposed along said path upstream from said machining zone for forming surface contours on said rod; means disposed within said machining zone along said path for performing at least one machining operation on said rod when same is immovably supported within said machining zone; and releasable holding means within said machining zone including at least one profiled surface shaped to releasably receive thereagainst in complementary relationship said surface contours for releasably and immovably holding said rod during a machining operation, said releasable holding means comprising a plurality of reciprocally mounted members longitudinally spaced apart along said path cooperative with said profiled surface when in a first position to immovably hold said rod in contact against said profiled surface and means operative when said plurality of reciprocally mounted members are moved out of said first position for effecting movement of said rod out of contact with the profiled surface on said holding means.

2. A device according to claim 1; further comprising guide means interposed between said forming means and said machining zone for guiding said rod along said predetermined path.

3. A device according to claim 1; including a coating of hard metal on said profiled surface hard enough to effect deformation of said rod during the operation of said releasable holding means whenever said surface contours on said rod do not complement said profiled surface.